(12) United States Patent
Sun et al.

(10) Patent No.: US 10,634,804 B2
(45) Date of Patent: Apr. 28, 2020

(54) SYSTEM AND METHOD FOR DIP-GUIDED SEISMIC IMAGE STACKING

(71) Applicant: CHEVRON U.S.A. INC., San Ramon, CA (US)

(72) Inventors: Yonghe Sun, Cypress, TX (US); Guojian Shan, Sugar Land, TX (US); Yue Wang, Sugar Land, TX (US); Craig Alan Barker, Sugar Land, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 208 days.

(21) Appl. No.: 14/975,997

(22) Filed: Dec. 21, 2015

(65) Prior Publication Data
US 2017/0176616 A1 Jun. 22, 2017

(51) Int. Cl.
*G01V 1/30* (2006.01)
*G01V 1/36* (2006.01)
*G01V 1/28* (2006.01)

(52) U.S. Cl.
CPC .............. *G01V 1/306* (2013.01); *G01V 1/362* (2013.01); *G01V 1/282* (2013.01); *G01V 1/364* (2013.01); *G01V 2210/51* (2013.01); *G01V 2210/514* (2013.01)

(58) Field of Classification Search
CPC ........ G01V 1/306; G01V 1/362; G01V 1/282; G01V 1/364
USPC ......................................................... 706/16
See application file for complete search history.

(56) References Cited

U.S. PATENT DOCUMENTS

| 6,278,949 B1 * | 8/2001 | Alam | G01V 1/288 |
| | | | 702/16 |
| 6,446,007 B1 * | 9/2002 | Finn | G01V 1/28 |
| | | | 702/14 |
| 7,859,942 B2 | 12/2010 | Stork | |
| 8,199,610 B2 | 6/2012 | Stork | |

(Continued)

FOREIGN PATENT DOCUMENTS

| WO | 2013134524 A2 | 9/2013 |
| WO | WO2014099200 A1 | 6/2014 |

(Continued)

OTHER PUBLICATIONS

PCT International Preliminary Report on Patentability, International Application No. PCT/US2016/055413, dated Jul. 5, 2018, pp. 1-8.

(Continued)

*Primary Examiner* — Patricia D Reddington
(74) *Attorney, Agent, or Firm* — Esplin & Associates, PC (57) ABSTRACT

A method is described for seismic imaging of the subsurface using dip-guided optimized stacking. The method computes weighting functions for a plurality of single-shot migrated images, unstacked seismic images, or partially stacked seismic images based on a slant stack performed using an input dip dataset; applying the plurality of weighting functions to the plurality of single-shot migrated images, unstacked seismic images, or partially stacked seismic images, or a plurality of dip-filtered images to create a plurality of weighted images; and summing the plurality of weighted images into a stacked seismic image. The method may be executed by a computer system.

18 Claims, 4 Drawing Sheets

(56) References Cited

U.S. PATENT DOCUMENTS

| | | | |
|---|---|---|---|
| 8,406,081 B2 | 3/2013 | Xia et al. | |
| 8,456,951 B2 | 6/2013 | Soubaras | |
| 8,553,499 B2 | 10/2013 | Albertin et al. | |
| 8,588,028 B2 | 11/2013 | Nichols et al. | |
| 8,830,788 B2 | 9/2014 | Xia et al. | |
| 2006/0269139 A1* | 11/2006 | Keskes | G01V 1/306 382/190 |
| 2011/0048731 A1* | 3/2011 | Imhof | G01V 1/345 166/369 |
| 2011/0131020 A1 | 6/2011 | Meng | |
| 2013/0311149 A1 | 11/2013 | Tang et al. | |
| 2014/0133275 A1 | 5/2014 | Guan et al. | |
| 2014/0198612 A1 | 7/2014 | Roberts et al. | |
| 2014/0200813 A1 | 7/2014 | Montel et al. | |
| 2015/0030210 A1* | 1/2015 | Matson | G01V 1/362 382/109 |
| 2015/0124559 A1 | 5/2015 | Cha et al. | |
| 2016/0061977 A1* | 3/2016 | Turnbull | G01V 1/36 702/17 |

FOREIGN PATENT DOCUMENTS

| | | |
|---|---|---|
| WO | WO2014099201 A1 | 6/2014 |
| WO | WO2014099202 A1 | 6/2014 |
| WO | WO2014099204 A1 | 6/2014 |

OTHER PUBLICATIONS

Wilfred Whiteside et al., "Directional Imaging Stack (DIS) for Shot Based Pre-Stack Depth Migrations", SEG Technical Program Expanded Abstracts 2012, Sep. 1, 2012, pp. 2-5, XP055330916.

\* cited by examiner

PRIOR ART

FIG. 4

SYSTEM AND METHOD FOR DIP-GUIDED SEISMIC IMAGE STACKING

TECHNICAL FIELD

The disclosed embodiments relate generally to techniques for deriving seismic images of the subsurface from geophysical seismic data and, in particular, to a method of generating a seismic image of the subsurface based on selective stacking of unstacked or partially stacked seismic images.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium, creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which is associated with a plurality of traces recorded at the plurality of sensors.

Seismic data are processed to create seismic images that can be interpreted to identify subsurface geologic features including hydrocarbon deposits. This imaging may involve propagation of wavefields through a velocity model of the subsurface, also called forward modeling. In complex subsurface areas, such as near salt bodies, seismic images are often contaminated with artifacts. Additionally, subsurface features such as salt bodies may include steeply dipping interfaces that do not reflect seismic energy in a direction that is recordable by the seismic sensors.

There exists a need for improved seismic images that will allow better seismic interpretation of potential hydrocarbon reservoirs.

SUMMARY

In accordance with some embodiments, a method of seismic imaging may include receiving, at a computer processor, a seismic dataset representative of a subsurface volume of interest organized as a plurality of single-shot migrated images, unstacked seismic images, or partially stacked seismic images and a dip dataset representative of a small range of structural dips at each image point of interest; performing amplitude processing on each single-shot migrated image, unstacked seismic image, or partially stacked seismic image to generate a plurality of amplitude-processed images; computing, for each amplitude-processed image, a weighting function for the amplitude-processed image based on a slant stack performed using the dip dataset to generate a plurality of weighting functions; applying the plurality of weighting functions to the plurality of single-shot migrated images, unstacked seismic images, or partially stacked seismic images, or a plurality of dip-filtered images to create a plurality of weighted images; summing the plurality of weighted images into a stacked seismic image; conditioning the amplitudes of the stacked seismic image; and interpreting geologic features based on the stacked seismic image. The method may further comprise scenario testing by repeating the method using different dip datasets including different geologically plausible dips and using the interpreted geologic structures related to each dip dataset to refine a subsurface model. In addition, the method may further comprise using the interpreted geologic features for at least one of seismic survey planning, well planning, and reserve estimation.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of seismic imaging. These embodiments are designed to be of particular use for seismic imaging of subsurface volumes in geologically complex areas.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. Processing seismic data and generating seismic images is a very complicated procedure. Seismic imaging relies on stacking of the image responses from a well distributed shots and receivers to form the images of the sub-subsurface reflectors. If the imaging velocity is nearly correct, constructive interferences with stationary-phase summation of the primary events ideally occur near the true reflector positions and dips. The stationary-phase summation is sensitive to illumination amplitudes, however. The images may not be properly formed and may be plagued by shallow zones and migration smiles not consistent with the true reflectors' positions and dips, when high-contrast geobodies weaken the illumination by some sources or receivers.

The above problem is acute for subsalt and near-salt imaging when the salt geometries are spatially extended and are highly irregular in shape, such as those seen in the Gulf of Mexico. Even for regions without illumination problems, the number of traces contributing specular reflections is generally much smaller in comparison with those contributing to migration smiles. When the illumination amplitudes of the specular reflections (i.e., the desired signal, corresponding to constructive interference from a small number of traces) is weak, the destructive cancellation of the migration smiles (noise, corresponding to the summation of large number of traces) is incomplete due discontinuous amplitude variations caused by the salt geometries, the weak images of the reflectors are easily dominated by strong noise.

The present invention includes embodiments of a method and system for producing seismic images in complex areas with poor illumination. Geologically plausible images are not arbitrary. Even in regions with poor imaging, interpreters often can narrow down the range of plausible reflector positions or dips. It is often possible to rule out with great confidence some dips that are not plausible. Such insights from interpreters can be incorporated in the imaging of the reflectors being interpreted for iterative interpretation refinement, by amplifying and validating the plausible dips and by attenuating the implausible ones. In this process, it is important that the amplitudes consistent with plausible dips are enhanced just enough to strengthen the structural imaging of locally dominant but poorly illuminated reflectors, but not so much as to destroy the relative amplitude character difference between adjacent reflectors which the interpreters rely to tell signals from dip-enhanced incoherent noise. The process is thus one of optimized stacking. The greatest optimization opportunity would have been before the image responses from individual traces are stacked. Such responses are not available in reverse time migration (RTM) imaging. The next available level of partial stacking is single-shot RTM for which the summation has been performed over the receivers, but not yet over shots. Other unstacked or partially stacked images, such as RTM angle gathers, source-image vector-offset gathers, or source-receiver vector-offset gathers may also be optimally stacked.

Figure 1:
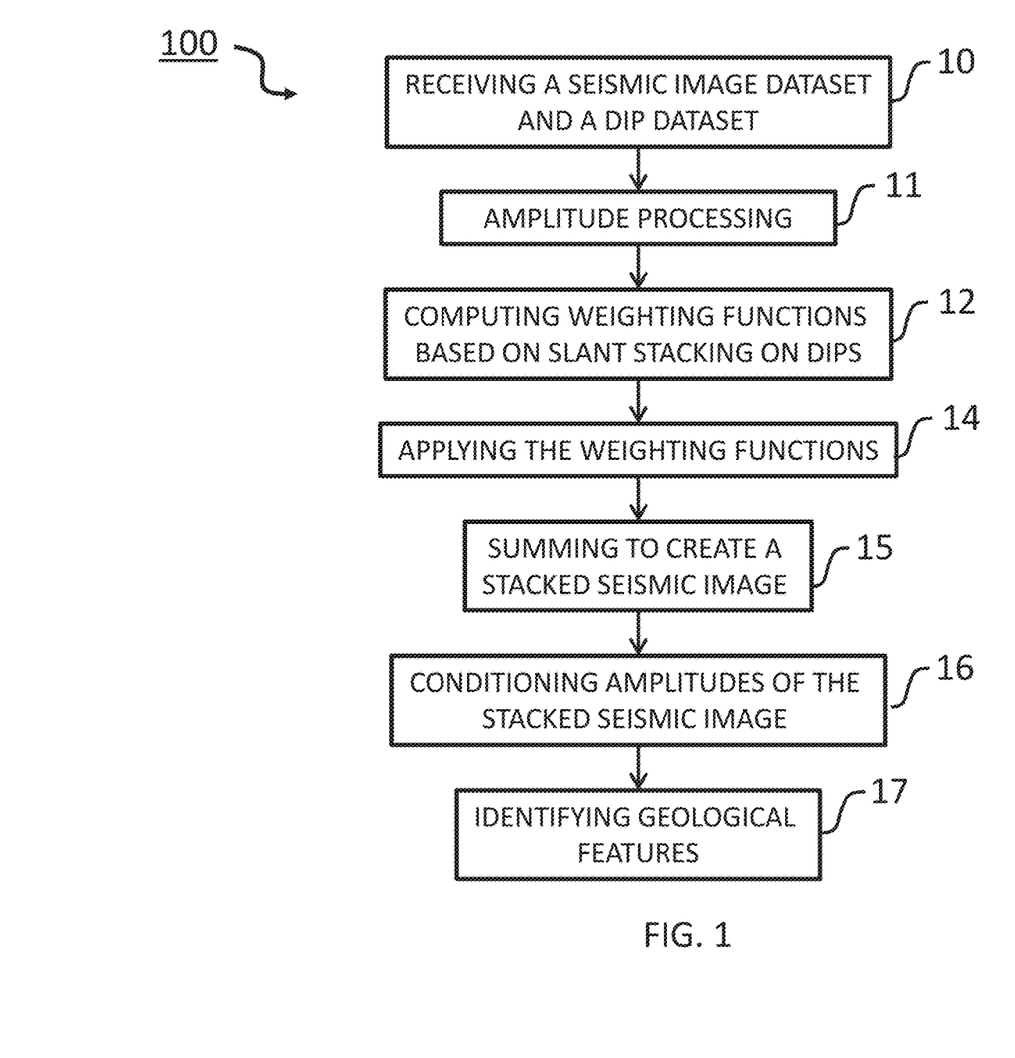
FIG. 1 illustrates a flowchart of a method of seismic imaging using dip-guided stacking, in accordance with some embodiments.

A seismic imaging method 100 is shown in FIG. 1. At operation 10, a seismic image dataset representative of the subsurface volume of interest is received. This seismic dataset may include a plurality of single-shot RTM images. It may also be other partially stacked image data, such as RTM angle gathers, source-image vector-offset gathers, or source-receiver vector-offset gathers, before they are fully stacked in all dimensions of acquisition or illumination. Seismic data are often collected one source (i.e., one shot) at a time for a large areal distribution of receivers. The data for each shot is called a common-shot gather. In the case of ocean-bottom-node survey, the data are separated into common-receiver gathers. Due to reciprocity, an RTM can take a common-receiver gather as if it is a common-shot gather. RTM takes a common-shot gather which contains many seismic traces recorded in time and injected them at the receiver locations in reverse-time order to model the wavefield in the subsurface before they arrive at the receivers. To form an image, RTM also injects a pulse in the earth model at the source point forward in time and generates a source wave field. Multiplying the two fields and summing over time creates a shot-image of the reflectors, portions of which are illuminated by the given source. The full image of subsurface is formed by summing or stacking all of the shot-images. For our purpose, the RTM shot-images have been pre-computed, kept unstacked, and stored in a form optimized for storage utilization and random access. They are used as input for stacking to be guided by dips (information about the orientations of subsurface reflectors). A dip dataset is also received in operation 10. The dip dataset includes a structural dip or a set of possible structural dips for each image point of interest. The dip dataset may be generated from an interpretation of a seismic dataset (e.g. seismic horizons). It can also include plausible or implausible orientations of the reflectors that are to be validated or rejected.

Method 100 then proceeds to perform amplitude processing 11 on the plurality of single-shot migration images. Each single-shot migration image $I(x_s,x)$ includes imaging points at subsurface locations x associated with shot location $x_s$. Amplitude processing of each $I(x_s,x)$ may include single-shot amplitude compensation to further mitigate effects of geometric spreading, attenuation, and other factors, to produce a plurality of amplitude compensated images $I_c(x_s,x)$. RTM implementations usually include some illumination compensation as a part of the shot-image formation. Additional amplitude processing may include amplitude balancing such as 3D Automatic Gain Control (AGC), a conventional method for compensating spatially uneven amplitude distributions for the purpose of structural imaging. If 3D amplitude balancing (e.g., 3D AGC) is applied, it should use AGC gates in all three dimensions of (x, y, z) that are short enough to be effective and yet large enough so that relative reflector amplitude among adjacent reflectors are preserved for structure and reflector-character identification. The result will be a plurality of gained and compensated images $I_{cg}(x_s,x)$. It may be desirable to apply smooth amplitude scaling with 3D window lengths on the same order as the 3D AGC gates so the image amplitudes (e.g., RMS) over the window are not too dissimilar to ones that would be expected if the high-contrast geobodies were not present. This would result in a plurality of amplitude-processed single-shot migrated images $I_{cgs}(x_s,x)$. Although this embodiment suggests three possible amplitude processing algorithms, it should be understood that the present invention does not require all or any of the three steps to be performed and is not limited to using them for conditioning the shot images to improve their suitability as input. In addition, to mitigate the risk of introducing false reflector structure in later operations of method 100, it is desirable that the windows or gates used in this operation should be large enough that the relative amplitudes among adjacent packages of reflectors are not destroyed. This way interpreters can still tell the top of salt or bottom of salt from other reflectors using both amplitude and dip hints and can still identify other horizons by amplitude characteristics. Moreover, those of skill in the art will appreciate that there are a number of other amplitude processing steps that may be useful in addition to or in place of the methods described above which will fall within the scope of the present invention.

After the amplitude processing 11, method 100 computes weighting functions based on slant stacking on dips 12. In this operation, the dip dataset received in operation 10 is used to find an input dip $n(x)$ at each image point x. For each of the plurality of amplitude-processed single-shot migrated images $I_{cgs}(x_s,x)$, the following process is used: For [a small spatial window in x, y, and z (e.g., with widths varying from a fraction to several wavelengths in size) centered at each image point x]{ a. Compute the slant stack trace of $I_{cgs}(x_s,x)$ using the input dip $n(x)$. The slant stacking variable is the signed displacement from x along the direction n. The result can be used to build $S_{cgs}(x_s,x; n)$, a dip-filtered version of $I_{cgs}(x_s,x)$. The slant stack $S_{cgs}(x_s,x; n)$ has smaller amplitudes if the dip of the image is less aligned with input dip.

b. Sum (e.g., the squares) the amplitudes $I_{cgs}(x_s,x)$ and $S_{cgs}(x_s,x; n)$ within the window in the sense of a norm (e.g., RMS), to get $AI_{cgs}(x_s,x)$ and $AS_{cgs}(x_s,x; n)$. For example, $AI_{cgs}(x_s,x)=\{\Sigma_{\Delta x} \ [I_{cgs}(x_s,x+\Delta x)]^2\}^{1/2}$ and $AS_{cgs}(x_s,x; n)=\{\Sigma_{\Delta x} \ [S_{cgs}(x_s,x+\Delta x; n)]^2\}^{1/2}$, where the summation is over 3D window around the image point x.

c. Compute the ratio $r_{cgs}(x_s,x; n)=AS_{cgs}(x_s,x; n)/AI_{cgs}(x_s,x)$. This ratio will be smaller where the dip of the image $I_{cgs}(x_s,x)$ is less aligned with the input dip $n(x)$.

d. The ratio $r_{cgs}(x_s,x; n)$ can be used as a dimensionless weighting function $W_{cgs}(x_s,x; n)$ for stacking the single-shot RTMs. The weighting function can be more general, however, with the numerator and denominator raised to different powers. They may also be smoothed or otherwise conditioned to achieve desired amplitude behavior.}

After the weighting function $W_{cgs}(x_s,x; n)$ is computed for each single-shot migrated image, $W_{cgs}(x_s,x; n)$ is applied to each single-shot migrated image and/or to the dip-filtered image $S_{cgs}(x_s,x; n)$ at operation 14. This is done as $I_{cgsw}(x_s,x; n)=I_{cgs}(x_s,x)*W_{cgs}(x_s,x; n)$. Damping (i.e., avoiding division by zero or small values) should be used because the weights involve a division operation. Simple functions with damping can be used to control the weighting. The weight can be applied to the dip-filtered image to $S_{cgsw}(x_s,x; n)=S_{cgs}(x_s,x; n)*W_{cgs}(x_s,x; n)$. Note that in order to reduce the risk of introducing false reflector structures in this operation, $W_{cgs}(x_s,x; n)$ should be a gentle function of the dip. When it is applied to the amplitude-normalized image $I_{cgs}(x_s,x)$ which is not dip-filtered, sharp fault-truncations within a single-shot migrated image are still preserved to some degree, as least more than would result from a conventional dip-filtering. In regions where the dip of the targeted reflector is known with confidence and varies slowly along the reflector, a dip-filtered version $\Sigma_s S_{cgsw}(x_s,x; n)$ would be appropriate. In this case, the degree of dip-filtering can be moderated by weighting or by adjusting slant-stacking window size so events with dips near, but not identical to, the input dip are still retained to varied degrees.

Method 100 continues on to summing the weighted images into a stacked seismic image 15. This operation is effectively summing over the shots to create the weighted stack $\Sigma_s I_{cgsw}(x_s,x; n)$ and/or weighted slant stack $\Sigma_s S_{cgsw}(x_s,x; n)$. The stacked seismic image will have attenuated seismic artifacts or reflectors of dips inconsistent with the input dip and enhanced imaging of reflectors or noise aligned with input dip, particularly in areas of poor illumination, as compared with raw straight stacked seismic images $\Sigma_s I(x_s,x)$. The stacked seismic image may have its amplitudes conditioned 16, for example traditional AGC may be applied to stack. As another example, stack may be further compensated for overall illumination as measured by a stack $\Sigma_s AS_{cgs}(x_s,x; n)$ or $\Sigma_s AI_{cgs}(x_s,x)$. The stacked seismic images from operation 16 are therefore better for identifying geological features in the subsurface 17. In particular, the stacked seismic image of method 100 can be used to refine salt structure interpretations and reflector locations adjacent to and below salt bodies. Proper identification of such features is useful in hydrocarbon exploration because salt bodies are good seals for hydrocarbon reservoirs. The improved stacked seismic image may be used for scenario testing of several geologically plausible dips and for interpretive refining of the subsurface model, ultimately allowing improved reservoir delineation which may result in improved well planning and reserves estimation. The refined subsurface model may also be used for planning subsequent seismic surveys.

Although method 100 shows the operations occurring in a specific order, this is not meant to be limiting. Some operations may occur concurrently or in different orders. Moreover, additional operations not shown in FIG. 1 may also be employed. For example, for computational efficiency, optimizations such as coarse grid computations of the weighting factors and pre-computation of slant-stacking factors related to dip may be made to speed up the computation.

Figure 2A:
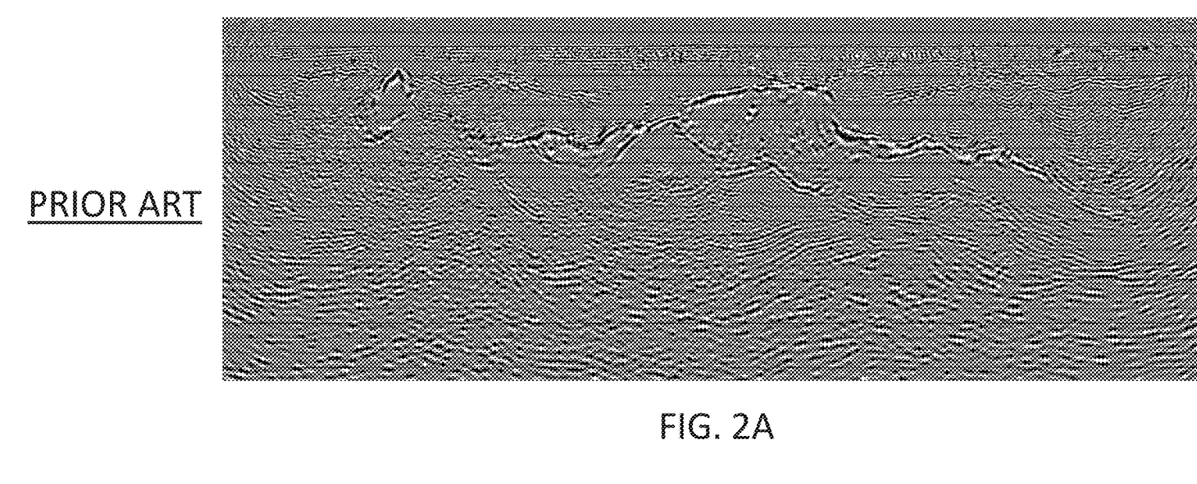
FIG. 2A is a seismic image created by conventional stacking (this seismic data is proprietary to MultiKlient Invest AS ("MKI"))
Figure 2B:
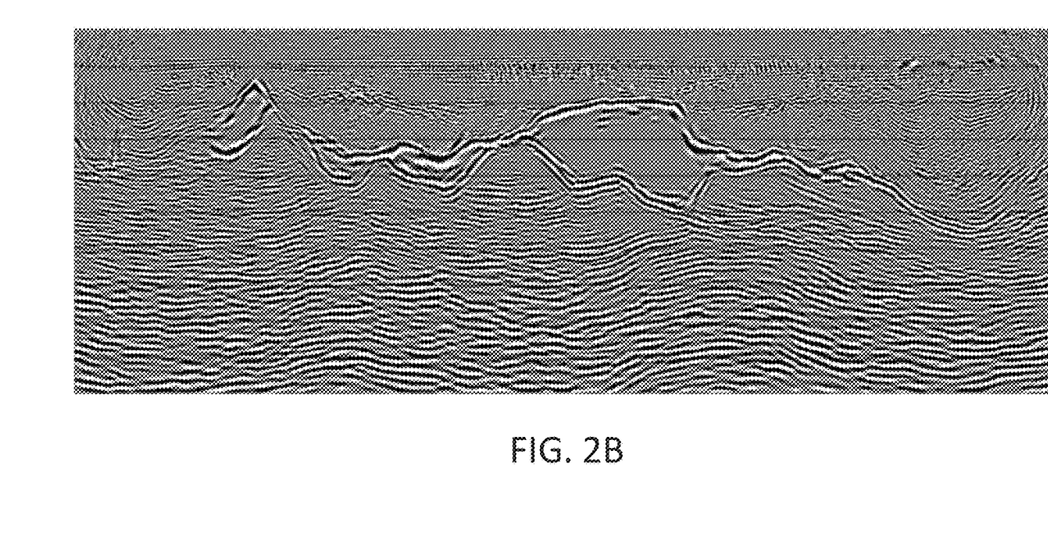
FIG. 2B is a seismic image created using an embodiment of the present invention.

FIG. 2A shows a conventional stacked seismic image, as processed by Chevron from seismic data proprietary to MM. An embodiment of method 100 of FIG. 1 was used to produce FIG. 2B using the same input seismic data as FIG. 2A, also processed by Chevron. FIG. 2B is the result of merging five separate images: the image above the top of salt as shown in FIG. 2A, the image band near the top of salt with stacking guided by a picked top of salt horizon, the image band near the bottom of salt with stacking guided by a picked bottom of salt horizon, and two subsalt images guided by two subsalt horizons. Each of the image bands was generated using method 100 with the different dip datasets. An AGC has been applied to the overall stack in 2A and 2B.

Figure 3A:
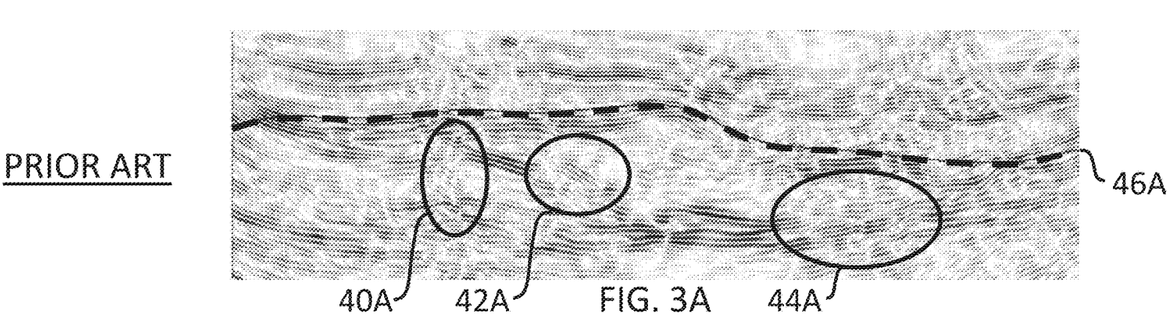
FIG. 3A is a seismic image created by conventional stacking.
Figure 3B:
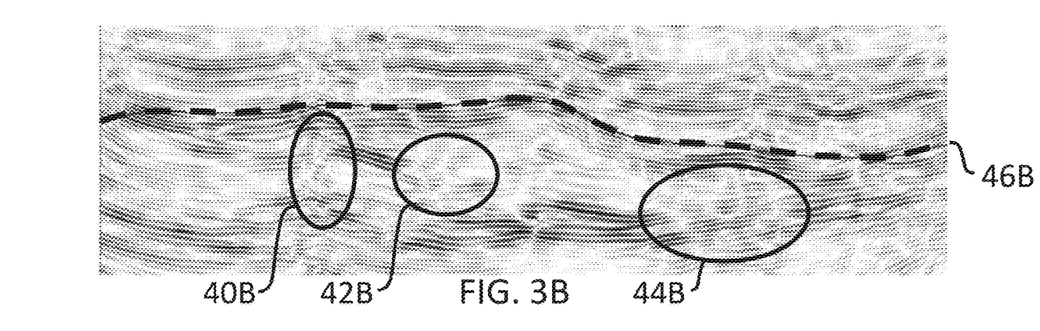
FIG. 3B is a seismic image created using an embodiment of the present invention.
Figure 3C:
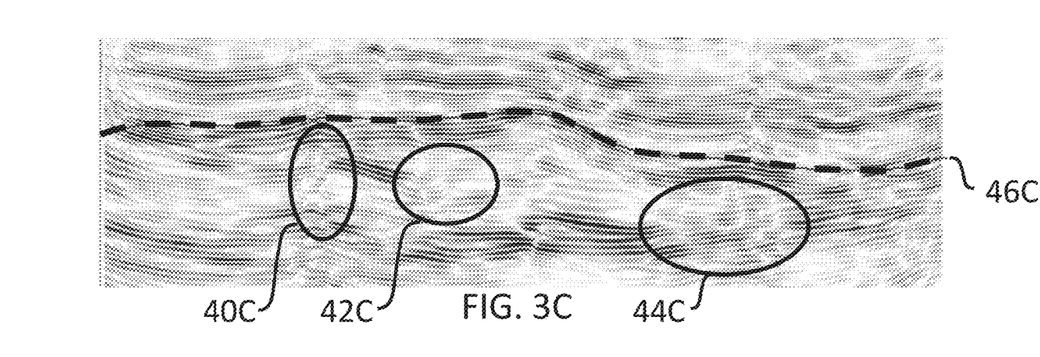
FIG. 3C is a seismic image created using a different embodiment of the present invention.

In yet another example, FIG. 3A shows a conventional stacked seismic image created by stacking reverse time migration (RTM) shot images. FIG. 3B was created by the method 100 where the final stacked seismic image is from dip-guided stacking of the RTM shot images. FIG. 3C was created by the method 100 where the final stacked seismic image is from dip-guided stacking of the dip-guided slant stack of the RTM shot images. Each of these stacked images has had AGC applied. In all three stacked seismic images, a dip dataset consisting of one horizon is shown as the dashed line (46A, 46B, and 46C, respectively). This is the dip dataset received during operation 10 of method 100 for the creation of the stacked seismic images in FIGS. 3B and 3C. The conventional stacked seismic image in FIG. 3A has several areas where the reflectors are poorly imaged (for example, area 40A and 44A) and/or appear as if the reflectors have unexpected dips that may indicate coherent noise (for example, area 42A). In both FIGS. 3B and 3C, the dip-guided stacking has improved the reflector continuity and fault identification in areas 40B, 40C, 44A, and 44C.

The possible coherent noise has been substantially attenuated in areas 42B and 42C. Overall, the stacked seismic images in FIGS. 3B and 3C generated by method 100 of the present invention are cleaner with better reflector continuity.

As demonstrated, embodiments of the present invention may be distinguished based on the type of input dip dataset. Four uses that are included in the scope of the present invention are:

Dip dataset consisting of one horizon: With the dip-volume derived from the preliminary interpretation of a geologic horizon, such the top of salt (TOS), bottom of salt (BOS), and subsalt surfaces, the stacked image guided by the preliminary horizon is used to refine or enable more precise picking of the surface. Interpreters should only pick structures with positions and dips not deviating too far from position and dip (<~±20°) of the horizon. Intended applications include refining strong reflectors such as TOS, BOS, and subsalt horizons.

Dip dataset consisting of a 3D dip volume: in regions with no conflict of dips, as is often the case in subsalt settings in the Gulf of Mexico (GOM), the dip-guided stack fills the same spatial extent of the dip volume. Intended applications include subsalt imaging in GOM where structures are simple, layered, and known with confidence. The dip-guided stack can be used to attenuate migration smiles, residual multiples, or other artifacts with dips significantly different from the expected dips.

Composite Stack: a composite dip-guided stack can be built by a seamless weighted combination of the above mentioned stacks using single-valued dip volumes or individual surfaces. This means that method 100 would be used multiple times with different dip datasets and the results themselves would be stacked, as seen in FIG. 3B. Applications include surgically repairing a stack that can be helped with dip-guided stack in some regions. A single region can receive multiple contributions by adding stacking separately guided with volumes of conflicting dips. Examples of regions with conflicting dips include faulted layers and salt-sediment boundaries.

Facilitating picking automation: Sometimes, the geologic horizons are interpretable, but plagued by random or coherent noise that can prevent automatic tracking by interpretation software. Dip guided stack can be used attenuate such noise to improve the signal-to-noise ratio of the desired horizon for robust auto-picking by a computer.

Figure 4:
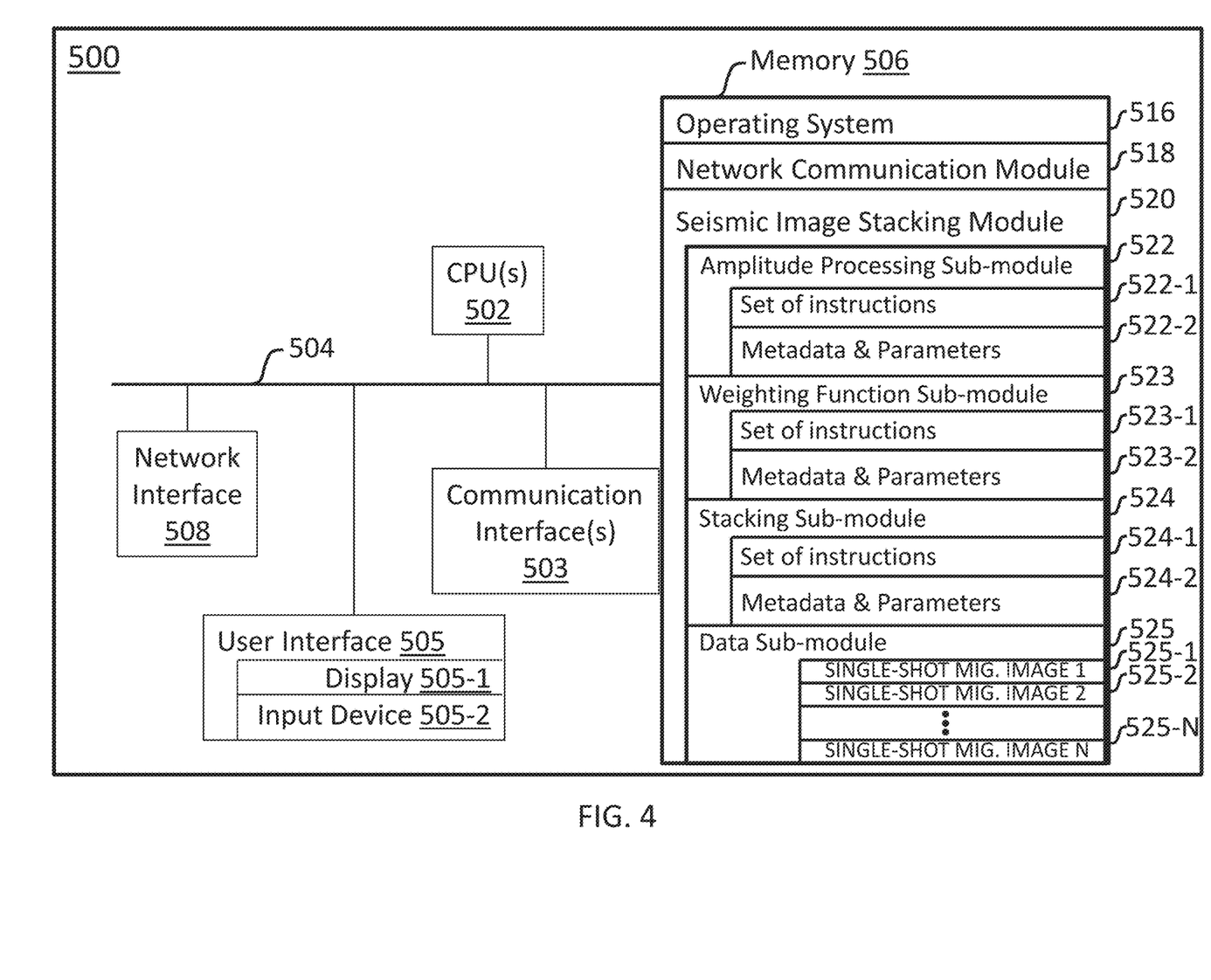
FIG. 4 is a block diagram illustrating a seismic imaging system, in accordance with some embodiments.

FIG. 4 is a block diagram illustrating a seismic imaging system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic imaging system 500 includes one or more processing units (CPUs) 502, one or more network interfaces 508 and/or other communications interfaces 503, memory 506, and one or more communication buses 504 for interconnecting these and various other components. The seismic imaging system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information including dip datasets.

In some embodiments, memory 506 or the non-transitory computer readable storage medium of memory 506 stores the following programs, modules and data structures, or a subset thereof including an operating system 516, a network communication module 518, and a seismic image stacking module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the seismic image stacking module 520 executes the operations of method 100. Seismic image stacking module 520 may include data sub-module 525, which handles the seismic dataset including single-shot migrated images or other unstacked or partially stacked seismic images 525-1 through 525-N. These single-shot migrated images or other unstacked or partially stacked seismic images are supplied by data sub-module 525 to other sub-modules.

Amplitude processing sub-module 522 contains a set of instructions 522-1 and accepts metadata and parameters 522-2 that will enable it to execute operation 11 of method 100. The weighting function sub-module 523 contains a set of instructions 523-1 and accepts metadata and parameters 532-2 that will enable it to contribute to operations 12-14 of method 100. The stacking sub-module 524 contains a set of instructions 524-1 and accepts metadata and parameters 524-2 that will enable it to execute at least operation 15 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506. Also, additional sub-modules may be included, such as an interpretation sub-module that would execute operation 16 of method 100.

Method 100 is, optionally, governed by instructions that are stored in computer memory or a non-transitory computer readable storage medium (e.g., memory 506 in FIG. 4) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of:

source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of seismic imaging, the method being implemented in a computer system that includes one or more physical computer processors, the method comprising:
   a. receiving, by the one or more computer processors, a seismic image dataset representative of a subsurface volume of interest with multiple image points of interest therein and a dip dataset representative of a range of structural dips at each image point of interest, the seismic image dataset including seismic images of the subsurface volume of interest, the seismic images of the subsurface volume of interest including single-shot migrated images, unstacked seismic images, or partially stacked seismic images of the subsurface volume of interest;
   b. performing, by the one or more computer processors, amplitude processing on each seismic image of the subsurface volume of interest to generate a plurality of amplitude-processed images of the subsurface volume of interest;
   c. computing, by the one or more computer processors, for each amplitude-processed image of the subsurface volume of interest, a separate weighting function to generate multiple weighting functions, the generation of the weighting function for a given one of the amplitude-processed images including:
      computing a slant stack trace based on the dip dataset;
      building a dip-filtered version of the amplitude-processed image based on the slant stack trace; and
      computing the weighting function based on a ratio of a first sum of amplitudes of the dip-filtered version of the amplitude-processed image to a second sum of amplitudes of the amplitude-processed image, wherein the ratio is smaller where a dip of the amplitude-processed image is less aligned with an input dip of the dip dataset such that application of the weighting function to the seismic images of the subsurface volume of interest enables generation of a stacked seismic image of the subsurface volume of interest having attenuated artifacts or reflectors of dips inconsistent with the input dip;
   d. applying, by the one or more computer processors, the weighting functions to the seismic images of the subsurface volume of interest, or the dip-filtered versions of the amplitude-processed images to create a plurality of weighted images of the subsurface volume of interest;
   e. summing, by the one or more computer processors, the plurality of weighted images into the stacked seismic image of the subsurface volume of interest;
   f. conditioning, by the one or more computer processors, the amplitudes of the stacked seismic image of the subsurface volume of interest; and
   g. causing, by the one or more computer processor, an output representing with visual information the amplitudes of the stacked seismic image of the subsurface volume of interest, the visual information providing insight in interpreting geologic features based on the stacked seismic image of the subsurface volume of interest.

2. The method of claim 1, wherein the amplitude processing comprises 3D amplitude conditioning.

3. The method of claim 1, wherein the amplitude processing comprises single-shot amplitude compensation.

4. The method of claim 1, wherein the first sum of the amplitudes of the dip-filtered version of the amplitude-processed image and the second sum of the amplitudes of the amplitude-processed images are computed over a 3D spatial window centered at each image point of interest.

5. The method of claim 4, wherein the first sum of the amplitudes of the dip-filtered version of the amplitude-processed image and the second sum of the amplitudes of the amplitude-processed images are computed as root-mean-squares.

6. The method of claim 1, wherein the dip dataset consists of one or more distinct seismic horizons.

7. The method of claim 1, wherein the dip dataset consists of a 3D volume of dips.

8. The method of claim 1, wherein multiple dip datasets are used as input for multiple instances of the method to create multiple stacked seismic images and the multiple stacked seismic images are combined into a composite image.

9. The method of claim 1, wherein the conditioning the amplitudes of the stacked seismic image comprises 3D Automatic Gain Control (AGC).

10. The method of claim 1, further comprising using the interpreted geologic features for at least one of seismic survey planning, well planning, and reserve estimation.

11. The method of claim 1, further comprising repeating steps c through g using different dip datasets including different geologically plausible dips and using the interpreted geologic structures related to each dip dataset to refine a subsurface model.

12. A system, comprising:
one or more processors;
a data storage device storing a seismic image dataset and a dip dataset, the seismic image dataset representative of a subsurface volume of interest with multiple image points of interest therein and the dip dataset representative of a range of structural dips at each image point of interest, the seismic image dataset including seismic images of the subsurface volume of interest, the seismic images of the subsurface volume of interest including single-shot migrated images, unstacked seismic images, or partially stacked seismic images of the subsurface volume of interest;
memory; and
one or more programs, wherein the one or more programs are stored in the memory and configured to be executed by the one or more processors, the one or more programs including instructions that when executed by the one or more processors cause the one or more processors to
a. perform amplitude processing on each seismic image of the subsurface volume of interest to generate a plurality of amplitude-processed images of the subsurface volume of interest;
b. compute, for each amplitude-processed image of the subsurface volume of interest, a separate weighting function to generate multiple weighting functions, the generation of the weighting function for a given one of the amplitude-processed images of the subsurface volume of interest including:
computing a slant stack trace based on the dip dataset;
building a dip-filtered version of the amplitude-processed image based on the slant stack trace; and
computing the weighting function based on a ratio of a first sum of amplitudes of the dip-filtered version of the amplitude-processed image to a second sum of amplitudes of the amplitude-processed image, wherein the ratio is smaller where a dip of the amplitude-processed image is less aligned with an input dip of the dip dataset such that application of the weighting function to the seismic images of the subsurface volume of interest enables generation of a stacked seismic image of the subsurface volume of interest having attenuated artifacts or reflectors of dips inconsistent with the input dip;
c. apply the weighting functions to the seismic images of the subsurface volume of interest, or the dip-filtered versions of the amplitude-processed images to create a plurality of weighted images of the subsurface volume of interest;
d. sum the weighted images of the subsurface volume of interest into the stacked seismic image of the subsurface volume of interest;
e. condition the amplitudes of the stacked seismic image of the subsurface volume of interest; and
f. facilitate generation of output of visual information representing the amplitudes of the stacked seismic image of the subsurface volume of interest so that the visual information can be used for interpreting geologic features based on the stacked seismic image of the subsurface volume of interest.

13. The system of claim 12, wherein the first sum of the amplitudes of the dip-filtered version of the amplitude-processed image and the second sum of the amplitudes of the amplitude-processed images are computed over a 3D spatial window centered at each image point of interest.

14. The system of claim 13, wherein the first sum of the amplitudes of the dip-filtered version of the amplitude-processed image and the second sum of the amplitudes of the amplitude-processed images are computed as root-mean-squares.

15. The system of claim 12, wherein the dip dataset consists of one or more distinct seismic horizons.

16. The system of claim 12, wherein the dip dataset consists of a 3D volume of dips.

17. The system of claim 12, wherein multiple dip datasets are used as input for multiple instances of the method to create multiple stacked seismic images and the multiple stacked seismic images are combined into a composite image.

18. The system of claim 12, wherein steps c through g are repeated using different dip datasets including different geologically plausible dips and using the interpreted geologic structures related to each dip dataset to refine a subsurface model.

* * * * *